(12) United States Patent
Knospe et al.

(10) Patent No.: US 11,584,164 B2
(45) Date of Patent: Feb. 21, 2023

(54) NON-PNEUMATIC TIRE WITH MULTI-PIECE WEB

(71) Applicant: Bridgestone Americas Tire Operations, LLC, Nashville, TN (US)

(72) Inventors: Benjamin D. Knospe, Merrill, WI (US); Louis J. Stark, Kronenwetter, WI (US); Zachary G. Lorenz, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 368 days.

(21) Appl. No.: 16/767,256

(22) PCT Filed: Dec. 4, 2018

(86) PCT No.: PCT/US2018/063729
§ 371 (c)(1),
(2) Date: May 27, 2020

(87) PCT Pub. No.: WO2019/118225
PCT Pub. Date: Jun. 20, 2019

(65) Prior Publication Data
US 2021/0001668 A1   Jan. 7, 2021

Related U.S. Application Data

(60) Provisional application No. 62/598,591, filed on Dec. 14, 2017.

(51) Int. Cl.
*B60C 7/14*     (2006.01)
*B60C 7/10*     (2006.01)

(52) U.S. Cl.
CPC .............. *B60C 7/143* (2013.01); *B60C 7/107* (2021.08)

(58) Field of Classification Search
CPC   B60C 7/143; B60C 7/146; B60C 7/20; B60C 7/08; B60C 7/18; B60B 9/04; B60B 9/26
See application file for complete search history.

(56) References Cited

U.S. PATENT DOCUMENTS 818,568 A * 4/1906 Sims ..................... B60C 7/14
152/256
1,015,451 A   1/1912 McQueen
(Continued)

FOREIGN PATENT DOCUMENTS

CA   2011473 C   1/1998
CN   105216549   1/2016
(Continued)

OTHER PUBLICATIONS

Search Report and Written Opinion; Corresponding PCT Application No. PCT/US2018/063729 filed Dec. 4, 2018; Authorized Officer Chan Yoon Hwang; dated Mar. 22, 2019.
(Continued)

*Primary Examiner* — Kip T Kotter
(74) *Attorney, Agent, or Firm* — Shaun J. Fox; Bryan J. Jaketic

(57) ABSTRACT

A non-pneumatic tire includes a plurality of axially adjacent wheel portions. Each wheel portion has an inner ring, an outer ring, and a flexible, interconnected web extending between the inner ring and the outer ring. The flexible, interconnected web includes a plurality of web sectors disposed circumferentially about the tire to form a generally annular web. Each of the plurality of web sectors is hingedly connected to a pair of oppositely adjacent web sectors.

20 Claims, 17 Drawing Sheets

(56) References Cited

U.S. PATENT DOCUMENTS

| | | | |
|---|---|---|---|
| 1,103,445 A | 7/1914 | Streenburgh | |
| 1,300,933 A | 4/1919 | Divers | |
| 1,326,787 A | 12/1919 | Schmidt | |
| 1,345,912 A * | 7/1920 | Edling | B60B 9/04 152/12 |
| 1,353,731 A * | 9/1920 | Diskin | B60B 9/06 152/88 |
| 1,438,658 A | 12/1922 | Morand | |
| 3,130,766 A | 4/1964 | Amot et al. | |
| 3,493,027 A | 2/1970 | Dewhirst et al. | |
| 8,091,596 B2 | 1/2012 | Louden | |
| 8,104,524 B2 | 1/2012 | Manesh et al. | |
| 8,491,981 B2 | 7/2013 | Delfino et al. | |
| 8,517,068 B2 | 8/2013 | Delfino et al. | |
| 8,883,283 B2 | 11/2014 | Delfino et al. | |
| 8,962,120 B2 | 2/2015 | Delfino et al. | |
| 9,108,470 B2 | 8/2015 | Tercha et al. | |
| 9,180,737 B2 | 11/2015 | Amstutz et al. | |
| 9,387,726 B2 | 7/2016 | Choi et al. | |
| 9,487,052 B1 | 11/2016 | Asper | |
| 9,511,625 B2 | 12/2016 | Nishida et al. | |
| 9,511,631 B2 | 12/2016 | Fudemoto et al. | |
| 9,511,632 B2 | 12/2016 | Fudemoto et al. | |
| 9,550,393 B2 | 1/2017 | Abe et al. | |
| 9,616,703 B2 | 4/2017 | Masashi et al. | |
| 9,623,702 B2 | 4/2017 | Fudemoto et al. | |
| 2009/0211677 A1 | 9/2009 | Palinkas et al. | |
| 2010/0078111 A1 | 4/2010 | Anderson et al. | |
| 2011/0126948 A1 | 6/2011 | Boyer et al. | |
| 2014/0251518 A1 | 9/2014 | Akihiko et al. | |
| 2015/0246577 A1 | 9/2015 | Hiroyuki et al. | |
| 2015/0273945 A1 | 10/2015 | Hiroyuki et al. | |
| 2015/0273946 A1 | 10/2015 | Akihiko et al. | |
| 2016/0167434 A1 | 6/2016 | Masashi et al. | |
| 2016/0250893 A1 | 9/2016 | Takanori et al. | |
| 2016/0272006 A1 | 9/2016 | Akihiko | |
| 2016/0297244 A1 | 10/2016 | Akihiko | |
| 2017/0120680 A1 | 5/2017 | Takahashi et al. | |

FOREIGN PATENT DOCUMENTS

| | | |
|---|---|---|
| JP | H03248901 | 11/1991 |
| JP | H04221201 | 8/1992 |
| JP | 2008222038 | 9/2008 |
| JP | 2008539113 | 11/2008 |
| JP | 2009286208 | 12/2009 |
| JP | 2013112045 A | 6/2013 |
| KR | 1020160120920 | 10/2016 |
| WO | 2014039814 A1 | 3/2014 |
| WO | 2015072222 A1 | 5/2015 |
| WO | 2016109648 A1 | 7/2016 |
| WO | 2016109702 A1 | 7/2016 |
| WO | 2016152887 A1 | 9/2016 |

OTHER PUBLICATIONS

Search Report; Corresponding EP Application No. EP18888308; Authorized Officer Wolfgang Jung; dated May 31, 2021.
Written Opinion; Corresponding EP Application No. EP18888308; Authorized Officer Wolfgang Jung; dated May 31, 2021.

* cited by examiner

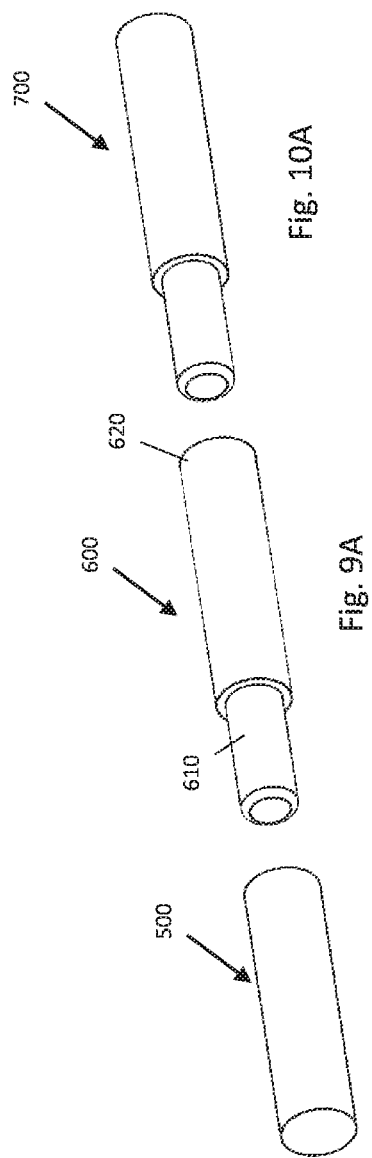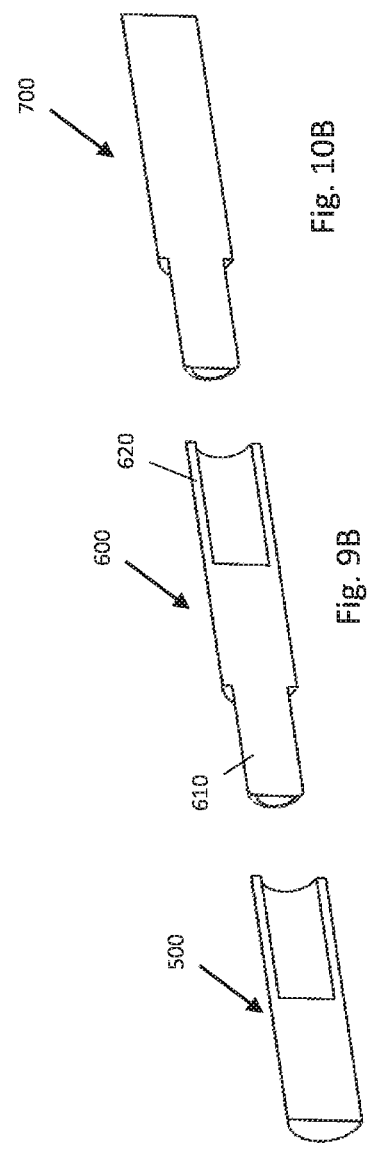

NON-PNEUMATIC TIRE WITH MULTI-PIECE WEB

FIELD OF THE INVENTION

The present disclosure is directed to a non-pneumatic tire. More particularly, the present disclosure relates to a non-pneumatic tire with a multi-piece web.

BACKGROUND

Non-pneumatic, or airless, tires (NPT) have previously been made of an entirely solid substance. These solid tires made the ride rather uncomfortable for passengers and caused greater damage to the suspension of a vehicle, which had to compensate for the lack of "give" in a solid tire.

More recently, NPTs have employed spokes or webbing extending between an inner ring and an outer ring. By way of example, U.S. Patent Application Publication 2006/0113016 by Cron, et al., and assigned to Michelin, discloses a non-pneumatic tire that it commercially refers to as the Tweel™. In the Tweel™, the tire combines with the wheel. It is made up of four parts that are eventually bonded together: the wheel, a spoke section, a reinforced annular band that surrounds the spoke section, and a rubber tread portion that contacts the ground.

SUMMARY OF THE INVENTION

In one embodiment, a non-pneumatic tire includes an inner ring having an axis of rotation and an outer ring. A flexible, interconnected web extends between the inner ring and the outer ring. The flexible, interconnected web includes a plurality of web sectors disposed circumferentially about the tire to form a generally annular web. The plurality of web sectors includes at least a first web sector, a second web sector, and a third web sector. Each of the plurality of web sectors has a first end and a second end. The second web sector is disposed circumferentially between the first web sector and the third web sector. The first end of the second web sector is hingedly connected to the second end of the first web sector. The second end of the second web sector is hingedly connected to the first end of the third web sector.

In another embodiment, a method of making a non-pneumatic tire includes providing a plurality of a plurality of web sectors having at least a first web sector, a second web sector, and a third web sector. Each of the plurality of web sectors has a first end and a second end. The method further includes circumferentially arranging the plurality of web sectors to form a generally annular web, extending between an inner ring and an outer ring, such that the second web sector is disposed circumferentially between the first web sector and the third web sector. The method also includes hingedly connecting the first end of the second web sector to the second end of the first web sector and hingedly connecting the second end of the second web sector to the first end of the third web sector.

In yet another embodiment, a non-pneumatic tire includes a plurality of axially adjacent wheel portions. Each wheel portion has an inner ring, an outer ring, and a flexible, interconnected web extending between the inner ring and the outer ring. The flexible, interconnected web includes a plurality of web sectors disposed circumferentially about the tire to form a generally annular web. Each of the plurality of web sectors is hingedly connected to a pair of oppositely adjacent web sectors.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 7A is a detailed view of a hinged connection shown in FIG. 7;

FIGS. 8A and 8B are a perspective view and cross-sectional view, respectively of one embodiment of a socket for a hinged connection;

FIGS. 9A and 9B are a perspective view and cross-sectional view, respectively of one embodiment of a socket-pin for a hinged connection;

FIGS. 10A and 10B are a perspective view and cross-sectional view, respectively of one embodiment of a pin for a hinged connection;

DETAILED DESCRIPTION

Figure 1:
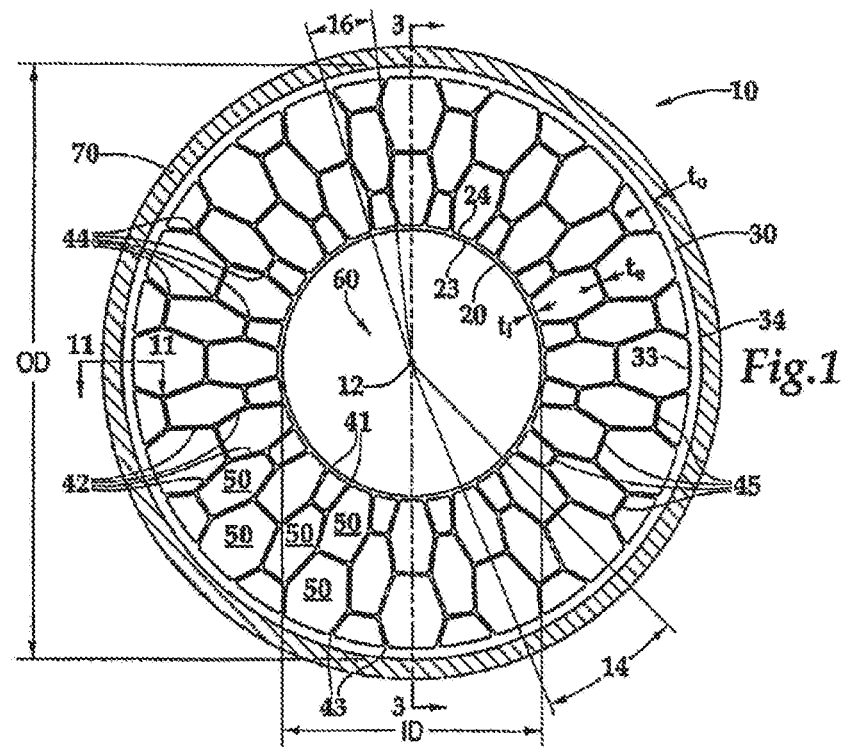
FIG. 1 is a front view of an undeformed non-pneumatic tire.
Figure 2:
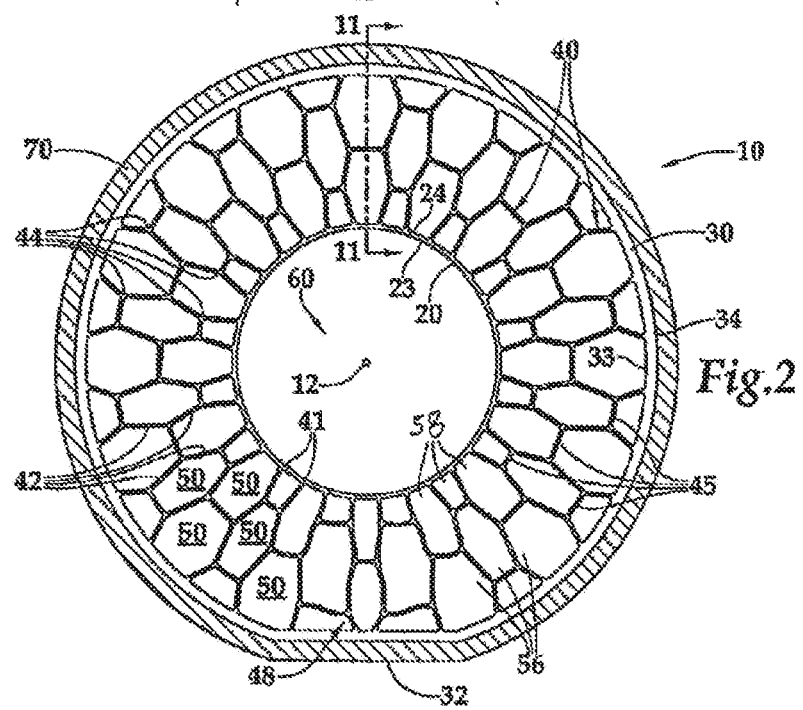
FIG. 2 is a front view of the non-pneumatic tire of FIG. 1 being deformed when subjected to a load.
Figure 3:
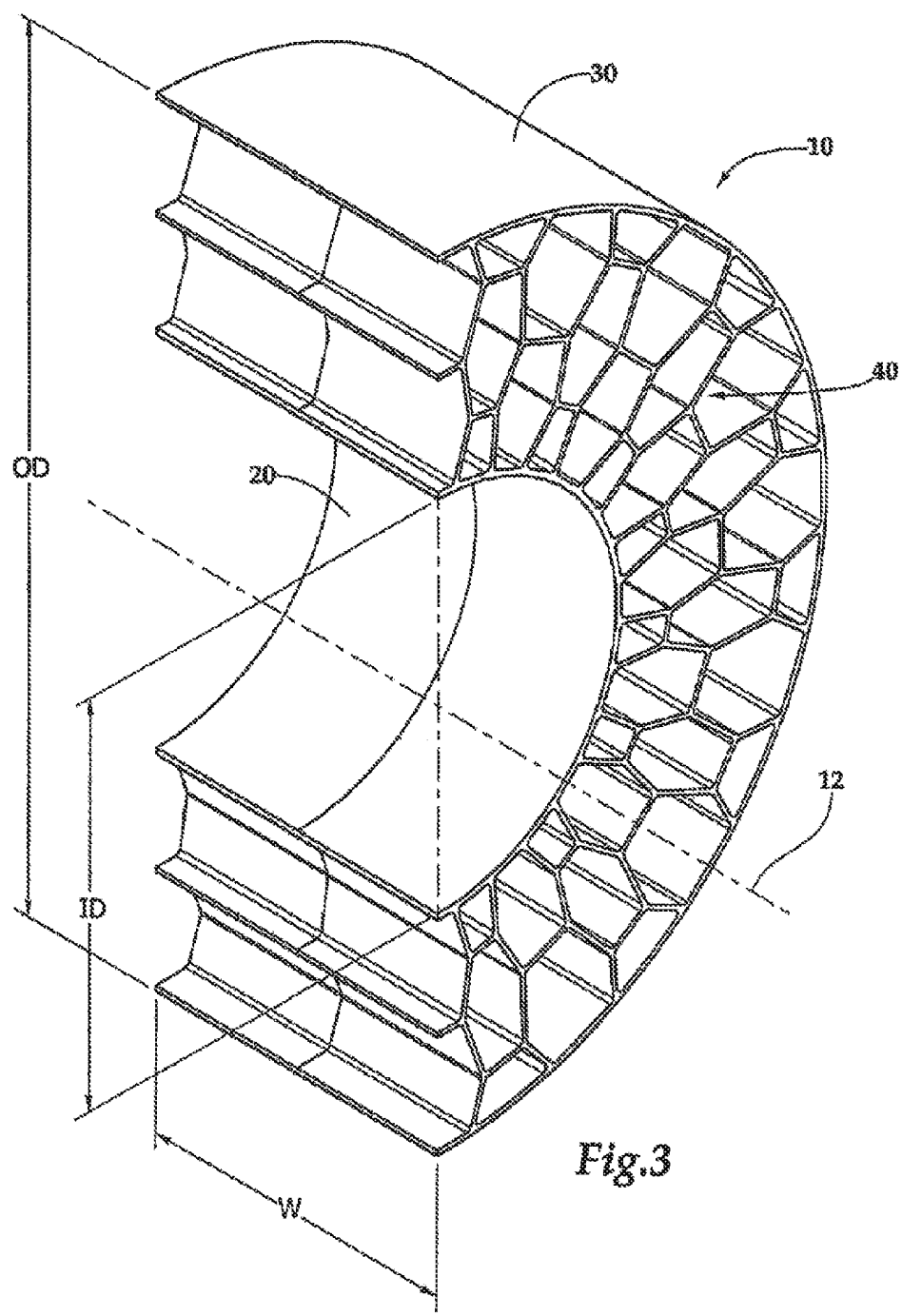
FIG. 3 is a sectional perspective view of the undeformed non-pneumatic tire taken along line 3-3 in FIG. 1.

FIGS. 1, 2, and 3 illustrate one embodiment of a non-pneumatic tire 10. In the illustrated embodiment, the non-pneumatic tire 10 includes a generally annular inner ring 20 that engages a wheel 60 to which tire 10 is mounted. The wheel 60 has an axis of rotation 12 about which tire 10 spins. The generally annular inner ring 20 has an inner diameter ID and comprises an internal surface 23 and an external surface 24 and can be made of cross-linked or uncross-linked polymers. In one embodiment, the generally annular inner ring 20 can be made of a thermoplastic material such as a thermoplastic elastomer, a thermoplastic urethane, or a thermoplastic vulcanizate. In another embodiment, the generally annular inner ring 20 can be made of rubber, polyurethane, or other suitable material. In this application, the term "polymer" means cross-linked or uncross-linked polymers.

For smaller applied loads, the generally annular inner ring 20 can be adhesively engaged with wheel 60 or can undergo some chemical structure change allowing it to bond to the wheel 60. For larger applied loads, the generally annular inner ring 20 can be engaged to the wheel 60 via some form of a mechanical connection such as a mating fit, although a mechanical connection can be used for supporting smaller loads as well. The mechanical engagement can provide both the wheel 60 and the generally annular inner ring 20 with extra strength to support the larger applied load. In addition, a mechanical connection has the added benefit of ease of interchangeability. For example, if the non-pneumatic tire 10 needs to be replaced, generally annular inner ring 20 can be detached from wheel 60 and replaced. The wheel 60 can then be remounted to the axle of the vehicle, allowing the wheel 60 to be reusable. In another embodiment, the inner ring 20 can be connected to the wheel 60 by a combination of a mechanical and adhesive connection.

With continued reference to FIGS. 1, 2 and 3, the non-pneumatic tire 10 further comprises a generally annular outer ring 30 surrounding an interconnected web 40 (discussed below). The outer ring 30 can be configured to deform in an area around and including a footprint region 32 (see FIG. 2), which decreases vibration and increases ride comfort. However, since in some embodiments the non-pneumatic tire 10 does not have a sidewall, the generally annular outer ring 30, combined with the interconnected web 40, can also add lateral stiffness to the tire 10 so that the tire 10 does not unacceptably deform in portions away from the footprint region 32.

In one embodiment, the generally annular inner ring 20 and a generally annular outer ring 30 are made of the same material as interconnected web 40 and have the same width W. For example, in one embodiment the inner ring, outer ring, and interconnected web are all comprised of a urethane material. The generally annular inner ring 20 and the generally annular outer ring 30 and the interconnected web 40 can be made by injection or compression molding, castable polymer, additive manufacturing, or any other method generally known in the art and can be formed at the same time so that their attachment is formed by the material comprising the inner ring 20, the outer ring 30 and the interconnected web 40 cooling and setting.

As shown in FIG. 1, the generally annular outer ring 30 has an outer diameter OD and can have a radially external surface 34 to which a tread carrying layer 70 is attached. Attachment can be done adhesively or using other methods commonly available in the art.

As shown in FIGS. 1, 2 and 3, the interconnected web 40 of non-pneumatic tire 10 connects the generally annular inner ring 20 to the generally annular outer ring 30. In the illustrated embodiment, the interconnected web 40 comprises at least two radially adjacent layers 56, 58 of web elements 42 that define a plurality of generally polygonal openings 50. In other words, with at least two adjacent layers 56, 58, a slice through any radial portion of the non-pneumatic tire 10 extending from the axis of the rotation 12 to the generally annular outer ring 30 passes through or traverses at least two generally polygonal openings 50. The polygonal openings 50 can form various shapes. In many embodiments, a majority of generally polygonal openings 50 can be generally hexagonal shape with six sides. However, it is possible that each one of the plurality of generally polygonal openings 50 has at least three sides. In one embodiment, the plurality of generally polygonal openings 50 are either generally hexagonal in shape or hexagonal in shape circumferentially separated by openings that are generally trapezoidal in shape, as can be seen in FIG. 1, giving interconnected web 40 a shape that can resemble a honeycomb. More broadly, the plurality polygonal openings 50 may include a first plurality of generally polygonal openings having a first shape and a second plurality of generally polygonal openings having a second shape different from the first shape.

A preferred range of angles between any two interconnected web elements (moving radially from the tread portion of the tire to the wheel) can be between 80 and 180 degrees (see, for example, the web elements of FIG. 1). Other ranges are also possible.

With continued reference to the illustrated embodiment of FIGS. 1, 2 and 3, the interconnected web 40 can be arranged such that one web element 42 connects to the generally annular inner ring 20 at any given point or line along the generally annular inner ring 20 such that there are a first set of connections 41 along the generally annular inner ring 20. Likewise, one web element 42 can connect to the generally annular outer ring 30 at any given point or line along an internal surface 33 of the generally annular outer ring 30 such that there are a second set of connections 43 along the generally annular outer ring 30. However, more than one web element 42 can connect to either the generally annular inner ring 20 or to the generally annular outer ring 30 at any given point or line.

The interconnected web 40 can further comprise intersections 44 between web elements 42 in order to distribute an applied load throughout the interconnected web 40. In the illustrated embodiments, each intersection 44 joins at least three web elements 42. However, in other embodiments, the intersections 44 can join more than three web elements 42, which can assist in further distributing the stresses and strains experienced by web elements 42.

In alternative embodiments, the web elements can be angled relative to a radial plane containing the axis of rotation that also passes through web element. By angling the web elements, an applied load that is generally applied perpendicular to the axis of rotation can be eccentrically applied to the web elements. This can create a rotational or bending component of an applied load on each web element, facilitating buckling of those web elements subjected to a compressive load. Similarly situated web elements can all be angled by about the same amount and in the same direction relative to radial planes. Preferably, however, the circumferentially consecutive web elements, excluding tangential web elements, of a layer of plurality of generally polygonal openings are angled by about the same magnitude but measured in opposite directions about radial planes such that web elements are generally mirror images about radial plane of one another.

In addition to the web elements 42 that are generally angled relative to radial planes 16 passing through axis of rotation 12, the interconnected web 40 can also include tangential web elements 45, as shown in FIGS. 1-3. The tangential web elements 45 can be oriented such that they are generally aligned with tangents to cylinders or circles centered at axis of rotation 12. The tangential web elements 45 are preferred because they assist in distributing applied load. For example, when the applied load is applied, the web elements 42 in a region above axis of rotation 12 are subjected to a tensile force. Without the tangential web elements 45, interconnected web 40 may try to deform by having the other web elements 42 straighten out, orienting themselves in a generally radial direction, resulting in stress concentrations in localized areas. However, by being oriented in a generally tangential direction, the tangential web elements 45 distribute the applied load throughout the rest of interconnected web 40, thereby minimizing stress concentrations.

With continued reference to FIGS. 1-3 the plurality of generally polygonal openings 50 are shown wherein each one of the plurality of generally polygonal openings 50 is radially oriented. As noted above, the generally polygonal openings 50 can be oriented such that they are symmetrical about radial symmetry planes 14 that pass through the axis of rotation 12. This arrangement can facilitate installation by allowing tire 10 to still function properly even if it is installed backwards because it should behave in the same manner regardless of its installed orientation.

Each of the openings within the plurality of generally polygonal tubular openings 50 can, but is not required, to be similar in shape. The number of openings 50 within the interconnected web 40 can vary. For example, the interconnected web 40 can have five differently sized openings patterned 16 times for a total of 80 cells, such as in FIG. 1. In other embodiments, other numbers of openings 50 can be used other than 16. For example, in some embodiments the interconnected web 40 could include between 12-64 patterns of cells. Other numbers outside of this range are also possible.

Openings in a radially inner layer can be similarly shaped as compared to those in a radially outer layer but can be sized differently from those openings such that the generally polygonal openings 50 increase in size when moving from opening to opening in a radially outward direction. However, a second plurality of generally polygonal openings in a radially outer layer can also be smaller than those in a first plurality of generally polygonal openings in a radially inner layer. In addition, the second plurality of generally polygonal openings can be either circumferentially separated from each other by a third plurality of generally polygonal openings or can be greater in number than the first plurality of generally polygonal openings, or it can be both.

With reference back to FIG. 2, the combination of the geometry of interconnected web 40 and the material chosen in interconnected web 40 can enable an applied load to be distributed throughout the web elements 42. Because the web elements 42 are preferably relatively thin and can be made of a material that is relatively weak in compression, those elements 42 that are subjected to compressive forces may have a tendency to buckle. These elements are generally between the applied load that generally passes through axis of rotation 12 and footprint region 32 and are represented as buckled section 48 in FIG. 2.

In one embodiment, some or all of the web elements 42 can be provided with weakened (e.g., previously bent) or thinned sections such that the web elements 42 preferentially bend or are biased to bend in a certain direction. For example, in one embodiment, the web elements are biased such that they bend generally in an outwardly direction. In this manner, web elements do not contact or rub against each other as they buckle. In addition, the position of the weakened or thinned portion can be used to control the location of the bending or buckling to avoid such contact.

When buckling occurs, the remaining web elements 42 may experience a tensile force. It is these web elements 42 that support the applied load. Although relatively thin, because web elements 42 can have a high tensile modulus they can have a smaller tendency to deform but instead can help maintain the shape of the tread carrying layer 70. In this manner, the tread carrying layer 70 can support the applied load on the tire 10 as the applied load is transmitted by tension through the web elements 42. The tread carrying layer 70, in turn, acts as an arch and provides support. Accordingly, the tread carrying layer 70 is sufficiently stiff to support the web elements 42 that are in tension and supporting the load. A substantial amount of the applied load may be supported by the plurality of the web elements working in tension. For example, in one embodiment, at least 75% of the load is supported in tension, in another embodiment at least 85% of the load is supported in tension and in another embodiment at least 95% of the load is supported in tension. In other embodiments, less than 75% of the load can be supported in tension.

Although the generally annular inner ring 20, the generally annular outer ring 30, and the interconnected web 40 can be constructed of the same material, they can all have different thicknesses. That is, the generally annular inner ring can have a first thickness, $t_i$, the generally annular outer ring can have a second thickness, $t_o$, and the interconnected web can have a third thickness, $t_e$. In the embodiment shown in FIG. 1, the first thickness $t_i$ can be less than the second thickness $t_o$. However, the third thickness, $t_e$, can be less than either first thickness, $t_i$, or the second thickness, $t_o$. Thinner web elements 42 buckles more easily when subjected to a compressive force whereas a relatively thicker generally annular inner ring 20 and the generally annular outer ring 30 can advantageously help maintain lateral stiffness of non-pneumatic tire 10 in an unbuckled region by better resisting deformation.

The thickness, $t_e$, of web elements 42 can vary, depending on predetermined load capability requirements. For example, as the applied load increases, the web elements 42 can increase in thickness, $t_e$, to provide increased tensile strength, reducing the size of the openings in the plurality of generally polygonal openings 50. However, the thickness, $t_e$, should not increase too much so as to inhibit buckling of those web elements 42 subject to a compressive load. As with choice of material, the thickness, $t_e$, can increase significantly with increases in the applied load. For example, in certain non-limiting embodiments, each web element 42 of interconnected web 40 can have a thickness, $t_e$ between about 0.04 inch and 0.1 inch thick for tire loads of about 0-1000 pounds, between about 0.1 and 0.25 inch thick for loads of about 500-5000 pounds, and between 0.25 and 0.5 inch thick for loads of about 2000 pounds or greater. Those of skill in the art will recognize that these thicknesses can be decreased or increased in modified embodiments.

Figure 4:
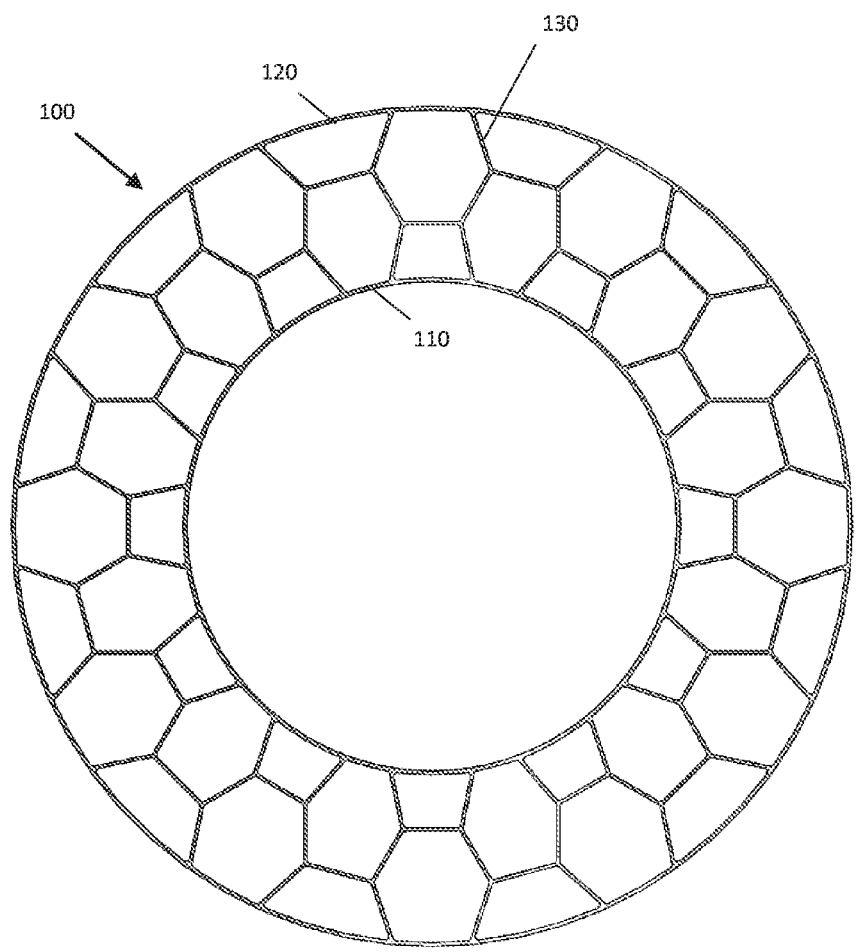
FIG. 4 is a front view of another embodiment of an undeformed non-pneumatic tire.

FIG. 4 illustrates a front view of another embodiment of a tire 100 having a generally annular inner ring 110, a generally annular outer ring 120, and a flexible, interconnected web extending between the inner ring 110 and the outer ring 120. The flexible, interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings. The inner and outer openings are aligned such that a radial plane that bisects an inner hexagonal opening would also bisect an outer trapezoidal opening, and a radial plane that bisects an inner trapezoidal opening would also bisect an outer trapezoidal opening. In this embodiment, the radial plane that bisects an inner opening would only pass through two openings—the inner opening and a corresponding outer opening. It should be understood, however, that this arrangement is merely exemplary and is being used for illustrative purposes. In alternative embodiments, web elements that form any shape may be employed.

In the illustrated embodiment, the inner and outer rings 110,120 and the flexible, interconnected web are formed as a unitary structure. Such a structure may be formed through a molding process or an additive manufacturing process. In alternative embodiments, such as those shown in FIGS. 5-15B and described in detail below, the inner and outer rings and interconnected web may be formed of multiple components that are assembled together in various manners. Each of the embodiments discussed below may have similar dimensions and exhibit the same properties as any of the non-pneumatic tires discussed above.

Figure 5:
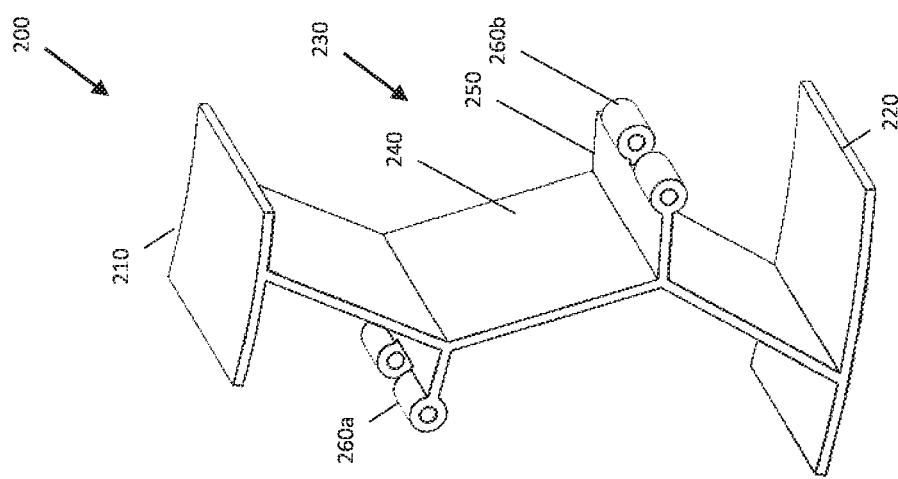
FIG. 5 is a perspective view of one embodiment of a web sector for a non-pneumatic tire.

FIG. 5 illustrates a perspective view of one embodiment of a web sector 200 for a non-pneumatic tire. The web sector 200 is a unitary component that includes an inner ring portion 210, an outer ring portion 220, and a web portion 230. In the illustrated embodiment, the web portion includes a three substantially radial web elements 240 and a pair of substantially circumferential web elements 250. In alternative embodiments (not shown), the web portion may be include any number of web elements extending in any direction.

In the illustrated embodiment, the web sector 200 further includes a pair of hinge portions, including a first hinge 260a disposed on a first substantially circumferential web element 250 and a second hinge 260b disposed on a second substantially circumferential web element 250. The hinges 260a, 260b are configured to mate with corresponding hinges on additional web sectors. In alternative embodiments, any number of hinges may be disposed on any web element.

Figure 6:
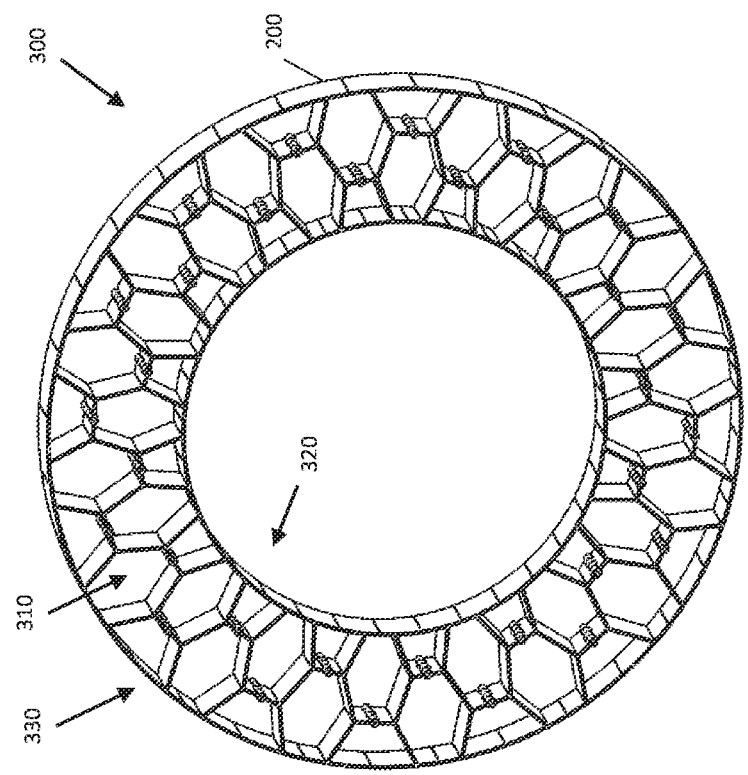
FIG. 6 is a perspective view of one embodiment of a non-pneumatic tire formed by a plurality of hingedly connected web sectors.

FIG. 6 illustrates a perspective view of one embodiment of a non-pneumatic tire 300 formed by a plurality of hingedly connected web sectors 200. The web sectors 200 are disposed circumferentially about the tire 300 to form a generally annular, flexible, and interconnected web 310. In the illustrated embodiment, an inner ring 320 of the tire 300 is formed by a plurality of inner ring sectors 210 that are circumferentially adjacent, and an outer ring 330 is formed by a plurality of outer ring sectors 220 that are circumferentially adjacent.

In the illustrated embodiment, each web sector 200 that forms the non-pneumatic tire 300 has substantially the same shape. However, adjacent web sectors 200 are disposed in opposite orientations, so that a first hinge 260a of one web sector 200 will mate with a corresponding first hinge 260a of an adjacent web sector 200, and a second hinge 260b of the web sector 200 will mate with a corresponding second hinge 260b of another adjacent web sector. In an alternative embodiment (not shown), the web sectors may be dimensioned such that each web sector is disposed in the same orientation. In another alternative embodiment (not shown), web sectors of different shapes may be employed.

Here, the web 310 is formed by 32 hingedly connected web sectors 200, with each web sector 200 being connected to a first web sector on a first side and a second web sector on a second side opposite the first side. In alternative embodiments, any number of web sectors may be employed. Preferably, a non-pneumatic tire will include at least three web sectors, including at least a first web sector, a second web sector, and a third web sector, with the second web sector disposed circumferentially between the first web sector and the third web sector, such that a first end of the second web sector is hingedly connected to a second end of the first web sector and a second end of the second web sector is hingedly connected to a first end of the third web sector.

Figure 7:
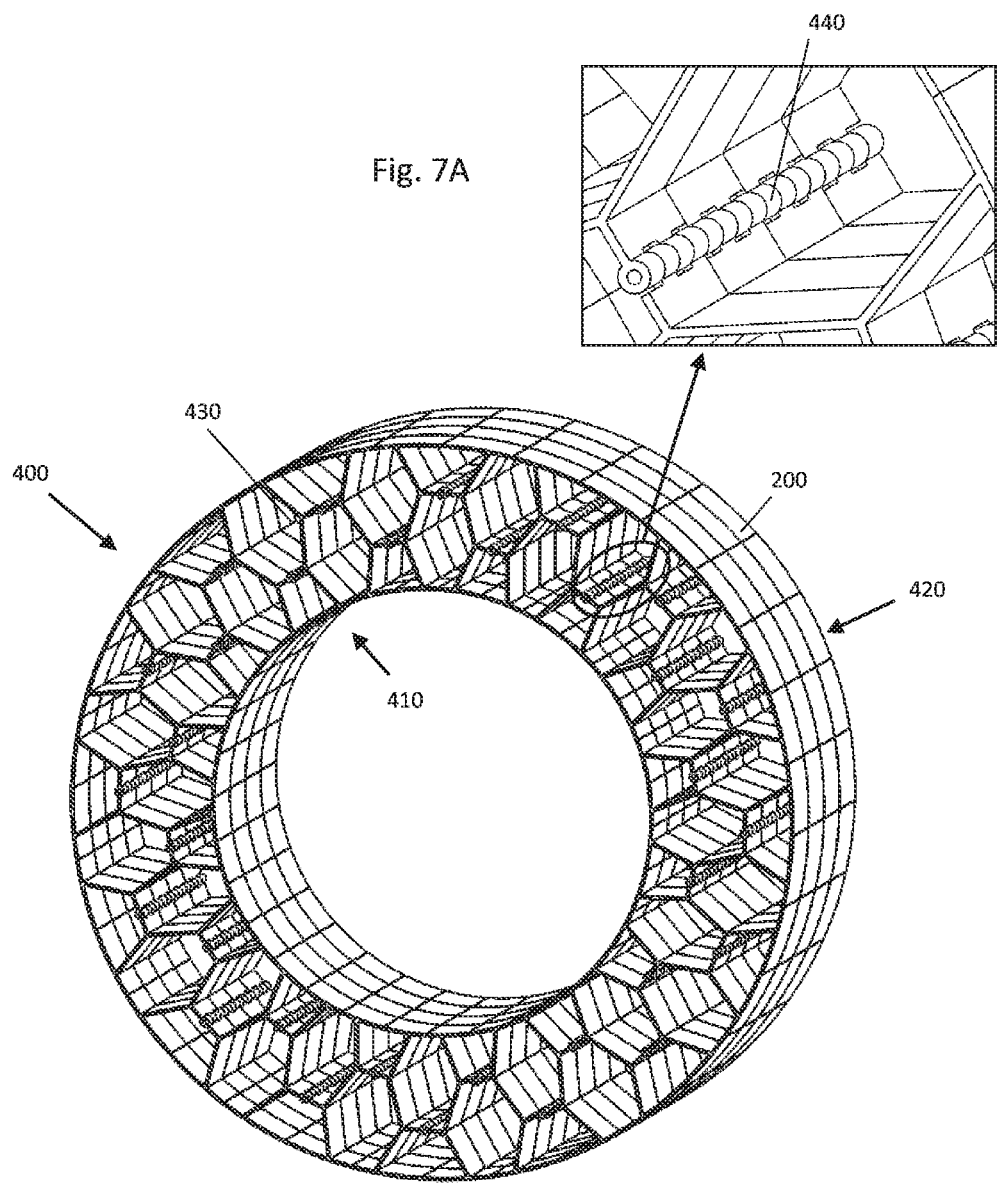
FIG. 7 is a perspective view of an alternative embodiment of a non-pneumatic tire formed by a plurality of hingedly connected web sectors.

In the FIG. 6 embodiment, each web sector 200 extends axially across the entire width of the tire 300. In alternative embodiments, a width of a non-pneumatic tire may be defined by two or more axially adjacent web sectors. For example, FIG. 7 illustrates a perspective view of a non-pneumatic tire 400 formed by a plurality of hingedly connected web sectors 200. In this embodiment, the width of the tire 400 is defined by four adjacent web sectors 200. Thus, an inner ring 410 of the tire 400 is formed by four axially adjacent inner ring portions 210 and the outer ring 420 is formed by four axially adjacent outer ring portions 220. Likewise, the flexible, interconnected web 430 of the tire 400 is formed by four axially adjacent web portions 230. In alternative embodiments, any number of axially adjacent web sectors may be employed.

FIG. 7A illustrates a detailed view of a hinged connection shown in FIG. 7. In this embodiment, the hinged connection includes a plurality of hollow barrels 440 from adjacent web sectors that are aligned together. In the illustrated embodiment, the barrels 440 from adjacent web sectors are aligned in an alternating fashion, such that the alternative barrels are in contact with each other. In such an embodiment, interfaces at outer and inner barrels could include self-aligning mating features to help with assembly. In an alternative embodiment, there may be gaps disposed between at least some of the alternating barrels.

The hollow barrels 440 are then secured with a removable rod or pin (not shown). The rod or pin may be threaded or unthreaded. The hinged connection may also include overmolded bearings or bushings to improve means of mechanical fastening or performance Such a structure may be referred to as a piano hinge design. The piano hinge design may be used to reduce lateral stiffness of the tire.

It should be understood that the number of hinge points could vary, depending on application loading demands, to refine stress concentrations at discontinuities. FIG. 7A shows two hollow barrels 440 per lateral element on the base part which, when combined with a mating part, has four total barrels 440 across the entire with of the section. This number could be reduced to as few as two total barrels, or as many as an application would allow.

In both the tires 300, 400 of FIGS. 6 and 7, when a load is applied, a substantial amount of the load is supported by a plurality of the radial web elements working in tension. A plurality of the radial web elements in a region above an axis of rotation are subjected to a tensile force while at least some of the radial web elements in a region between the load and a footprint region buckle and a plurality of the tangential web elements distribute the load through the flexible, interconnected web.

While not shown in the drawings, it should be understood that the tires 300, 400 may further include a tread carrying layer affixed to a radially external surface of the outer ring of each wheel portion.

The tires 300, 400 are formed by providing a plurality of a plurality of web sectors 200 including at least a first web sector, a second web sector, and a third web sector, each of the plurality of web sectors having a first end and a second end. The web sectors 200 are then circumferentially arranging the to form a generally annular web, extending between an inner ring and an outer ring, such that the second web sector is disposed circumferentially between the first web sector and the third web sector. The first end of the second web sector is then hingedly connected to the second end of the first web sector, and the second end of the second web sector is hingedly connected to the first end of the third web sector.

In the illustrated embodiment, the first hinge 260*a* of each web sector 200 is at a first radial elevation and the second hinge 260*b* is at a second radial elevation different from the first elevation. Thus, the step of hingedly connecting the first end of the second web sector to the second end of the first web sector includes hingedly connecting the first end of the second web sector to the second end of the first web sector at the first radial elevation. Likewise, the step of hingedly connecting the second end of the second web sector to the first end of the third web sector includes hingedly connecting the second end of the second web sector to the first end of the third web sector at the second radial elevation. It should be understood that the pins and hinges may be located at different radial and circumferential locations, including locations at or near the web nodes.

In addition to the piano hinge design of FIGS. 6 and 7, alternative hinge designs may be employed. For example, a plurality of sockets and pins may be employed to form a hinged connection. FIGS. 8-10 illustrate exemplary socket and pin formations. FIGS. 8A and 8B illustrate a perspective view and cross-sectional view, respectively of one embodiment of a socket 500 for a hinged connection. FIGS. 9A and 9B illustrate a perspective view and cross-sectional view, respectively of one embodiment of a socket-pin 600 for a hinged connection. The socket-pin 600 includes a pin end 610 and a socket end 620. The pin end 610 may be received in a socket 500 or a socket end 620 of a socket-pin 600. FIGS. 10A and 10B illustrate a perspective view and cross-sectional view, respectively of one embodiment of a solid pin 700 for a hinged connection. The solid pin 700 may also be received in a socket 500 or a socket end 620 of a socket-pin 600. The socket 500, socket-pin 600, and solid pin 700 may be employed in the manner shown in FIGS. 11A-E.

Figure 11A:
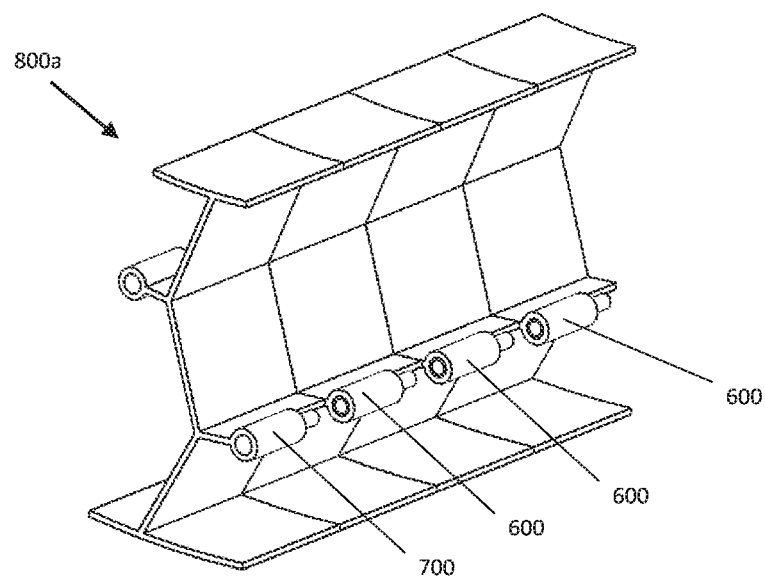
FIG. 11A is a perspective view of one embodiment of a first set of web sectors having a plurality of pins and sockets.
Figure 11B:
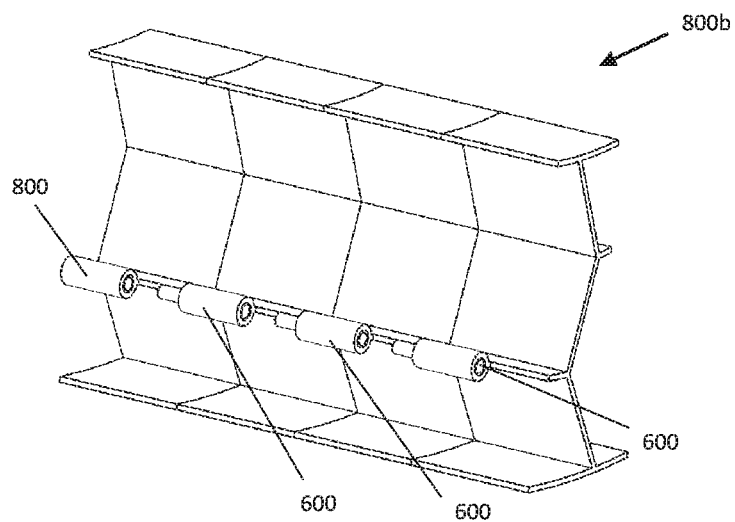
FIG. 11B is a perspective view of one embodiment of a second set of web sectors having a plurality of pins and sockets.

FIGS. 11A and 11B illustrate perspective views of a first and second set of web sectors 800*a,b* having a plurality of sockets 500, socket-pins 600, and solid pins 700. In the illustrated embodiment, the web sectors 800*a,b* have substantially the same structure as the web sectors 200 illustrated in FIGS. 5-7, with the exception of the hinged connections. However, it should be understood that any of the alternative designs discussed above may also apply to the web sectors 800*a,b* of FIG. 11.

Figure 11C:
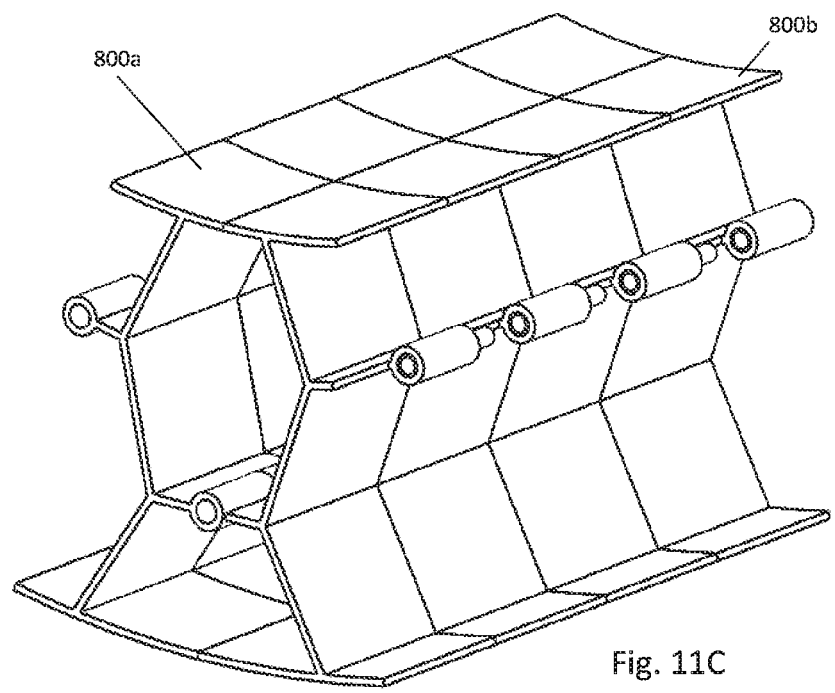
FIG. 11C is a perspective view of one embodiment of a first set of web sectors joined with a second set of web sectors.
Figure 11D:
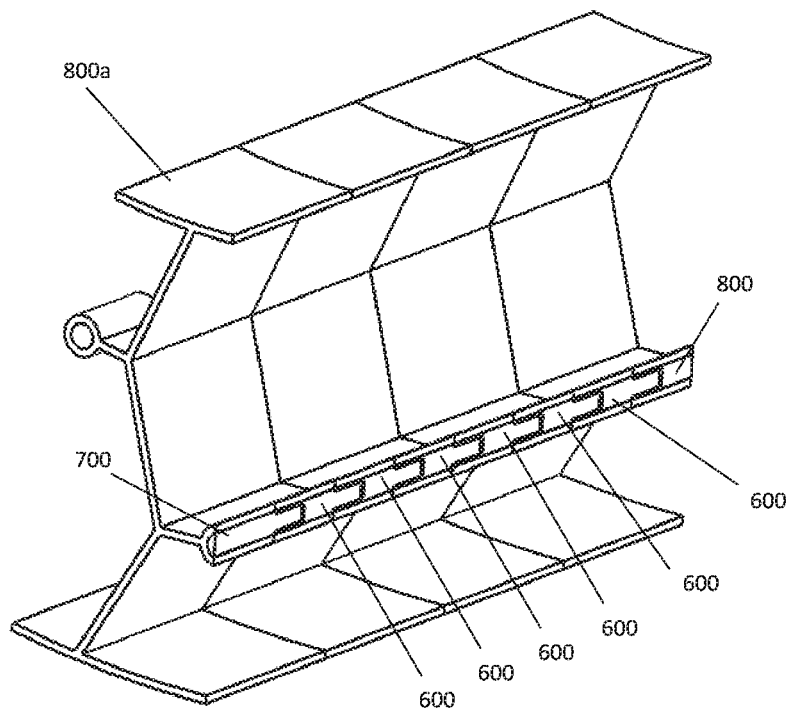
FIG. 11D is cross-sectional view of FIG. 11C.

The sockets 500, socket-pins 600, and solid pins 700 are arranged such that the first and second set of web sectors 800*a,b* can be mated together in the manner shown in the perspective view of FIG. 11C and in the cross-sectional view of FIG. 11D. Each socket-pin 600 and solid pin 700 is received in either a socket 500 or socket-pin 600.

Figure 11E:
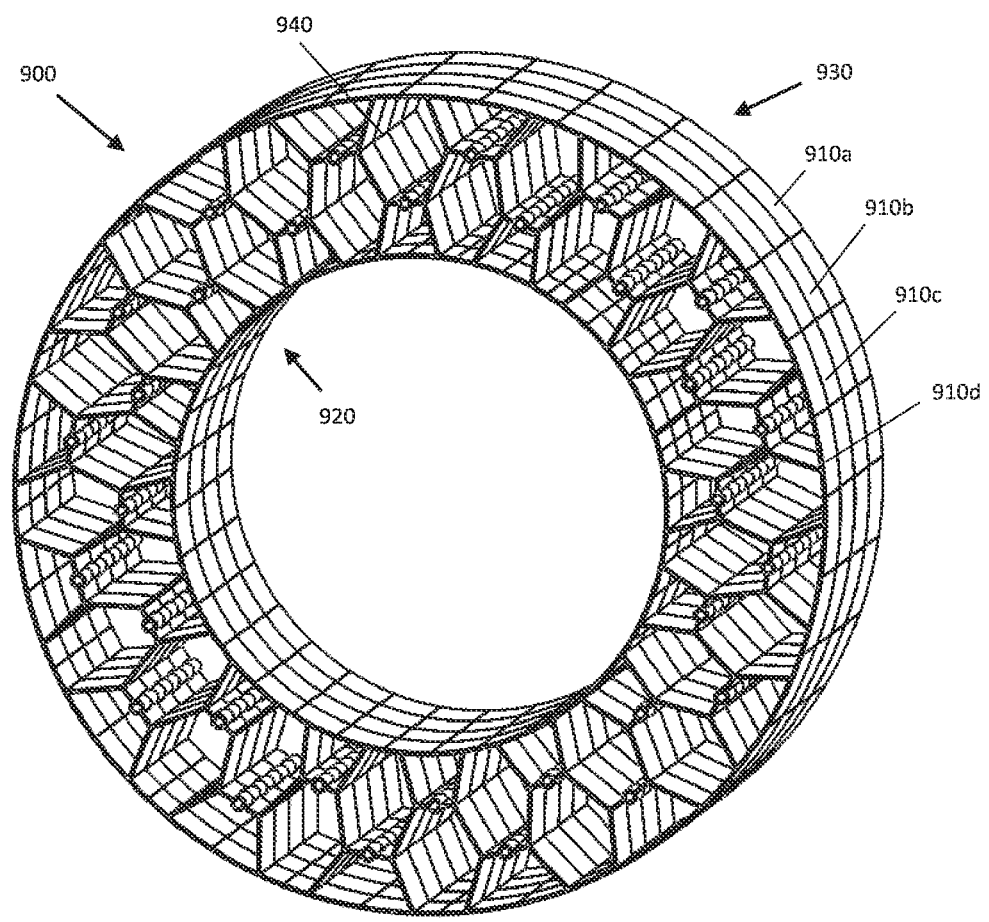
FIG. 11E is a perspective view of a non-pneumatic tire formed by a series of the web sectors shown in FIGS. 11A and 11B.

The web sectors 800 are joined together in this manner in both the axial and circumferential directions to form a non-pneumatic tire 900, as shown in FIG. 11E. In the illustrated embodiment, the web sectors 800 are mated together such that the width of a tire is defined by four axially adjacent web sectors 800, with the hinged connections of the outer web sectors 800 terminating in either a socket 500 or a solid pin 600. The non-pneumatic tire 900 thus includes four axially adjacent wheel portions 910*a*, 910*b*, 910*c*, and 910*d*, with each wheel portion 910 including an inner ring 920, an outer ring 930, and a flexible, interconnected web 940 extending between the inner and the outer rings 920, 930. However, it should be understood that the width of the tire 900 may be defined by any number of adjacent web sectors.

While not shown in the drawings, it should be understood that the tire 900 may further include a tread carrying layer affixed to a radially external surface of the outer ring of the wheel portions.

Figure 12:
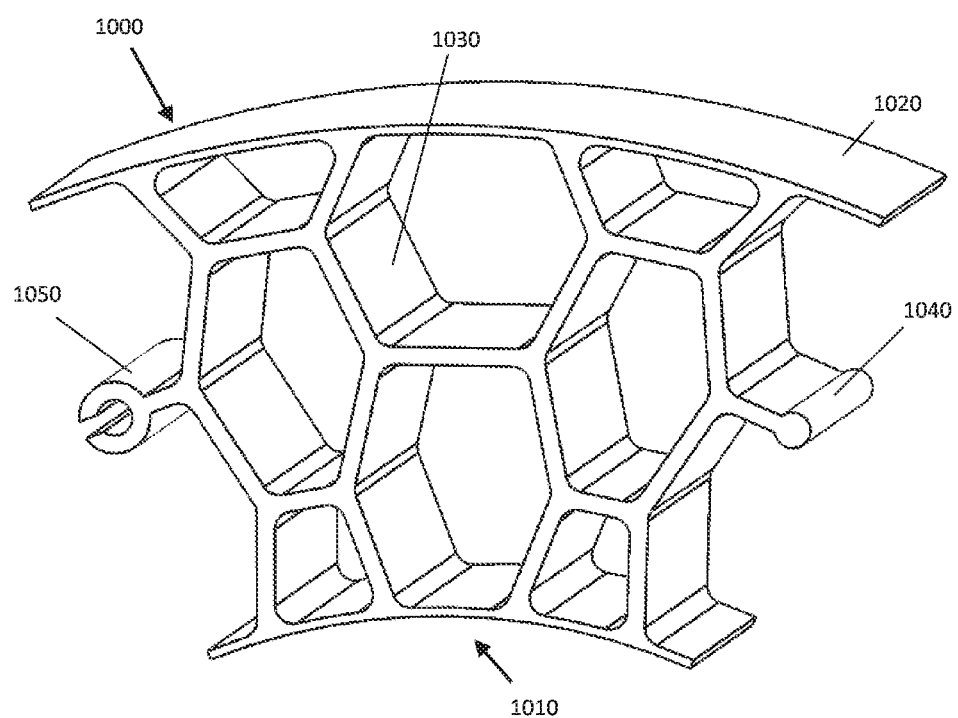
FIG. 12 is a perspective view of an alternative embodiment of a web sector having a ball and socket connection.

FIG. 12 illustrates a perspective view of another alternative embodiment of a web sector 1000. The web sector 1000 includes an inner ring portion 1010, an outer ring portion 1020, and a web portion 1030. In the illustrated embodiment, the web portion 1030 includes a plurality of substantially radial portions and a plurality of substantially tangent portions that form a plurality of polygonal openings. However, it should be understood that the web portion may take any shape.

In this embodiment, a first end of the web sector 1000 terminates in a ball 1040 and a second end of the of the web sector 1000 terminates in a socket 1050 configured to receive a ball. While the ball 1040 and socket 1050 are shown as extending laterally across the width of the entire web sector, in alternative embodiments, each ball and socket may extend across less than the width of the entire web sector. In such an embodiment, each end of the web sector may terminate in a plurality of balls or sockets.

Figure 13:
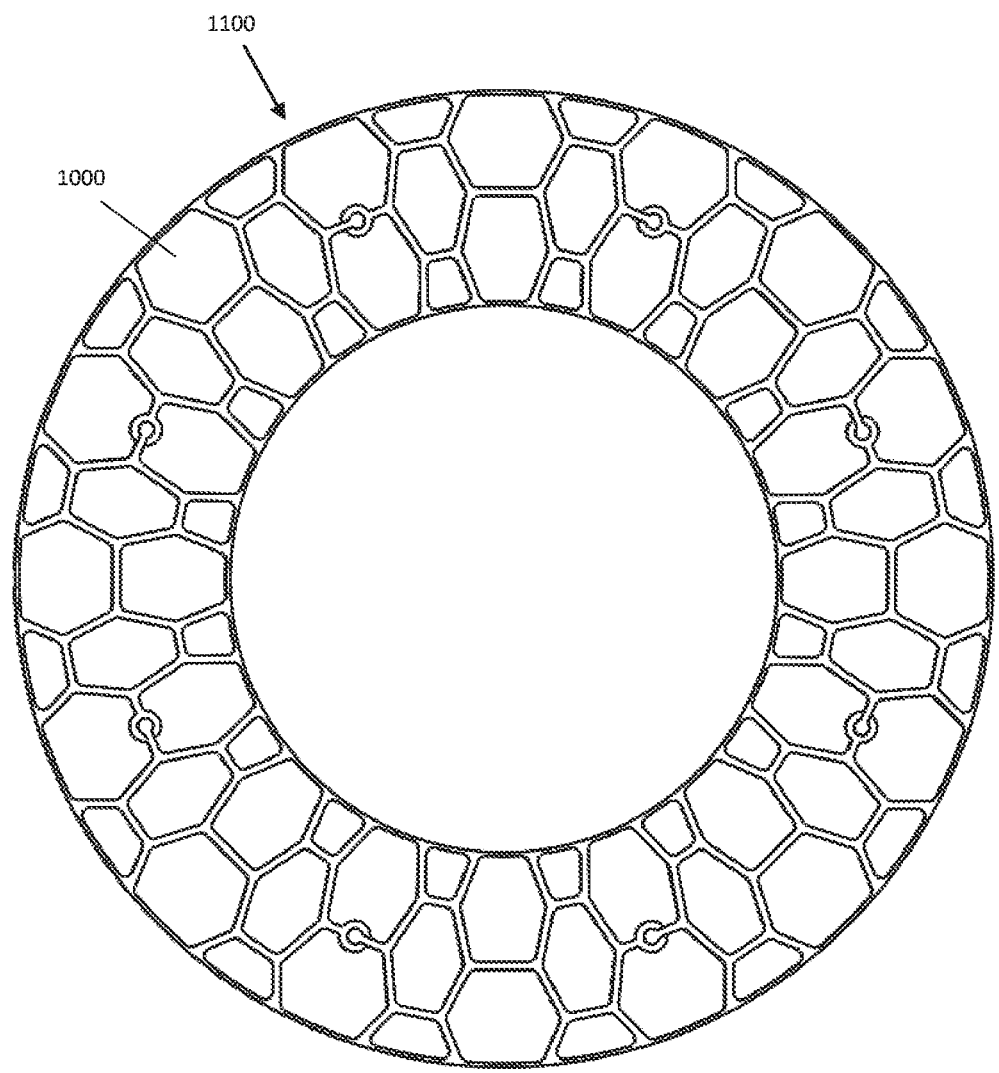
FIG. 13 is a front view of a non-pneumatic tire formed by a plurality of the web sectors shown in FIG. 12.

FIG. 13 illustrates a front view of a non-pneumatic tire 1100 formed by a plurality of the web sectors 1000 of FIG. 12. Here, the non-pneumatic tire 1100 is formed by inserting a ball portion on a first end of a first web sector into a socket portion on the second end of a second web sector, and repeating this process about the circumference of the tire. While the non-pneumatic tire 1100 is shown as being formed by eight web sectors 1000, it should be understood that any number of web sectors may be employed.

Figure 14A:
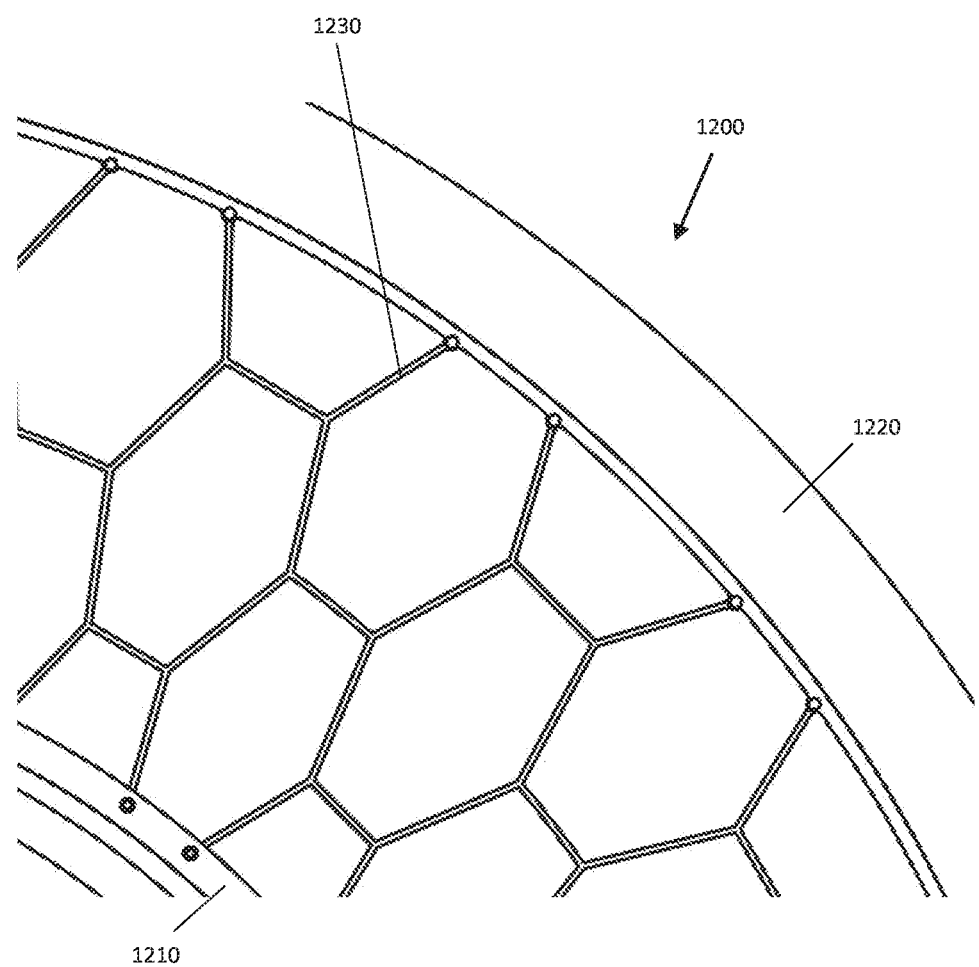
FIG. 14A is a front view of a portion of one embodiment of a non-pneumatic tire with a web hingedly connected to an outer ring.

The non-pneumatic tires 300, 400, 900, and 1100 described above each include web sectors with a unitary structure that includes an inner ring portion and an outer ring portion connected by a web portion. In alternative embodiments, non-pneumatic tires may include a web that is a separate structure and connected to an inner ring or an outer ring. For example, FIG. 14A illustrates a front view of a portion of one embodiment of a non-pneumatic tire 1200 with a wheel 1210, an outer ring 1220, and a web 1230. Here, the web 1230 is hingedly connected to the wheel 1210 and hingedly connected to the outer ring 1220. In alternative embodiments (not shown), the web is fixedly connected to at least one of the outer ring and the wheel.

In the illustrated embodiment, the outer ring 1220 is a solid ring. In an alternative embodiment, the outer ring is constructed of a plurality of ring portions. The ring portions may be ring sectors that extend circumferentially about the tire. Alternatively, the ring portions may by axially adjacent hoops. In another alternative embodiment, the ring portions may be a series of ring portions that are aligned in both the circumferential and axial directions to form a ring.

Figure 14B:
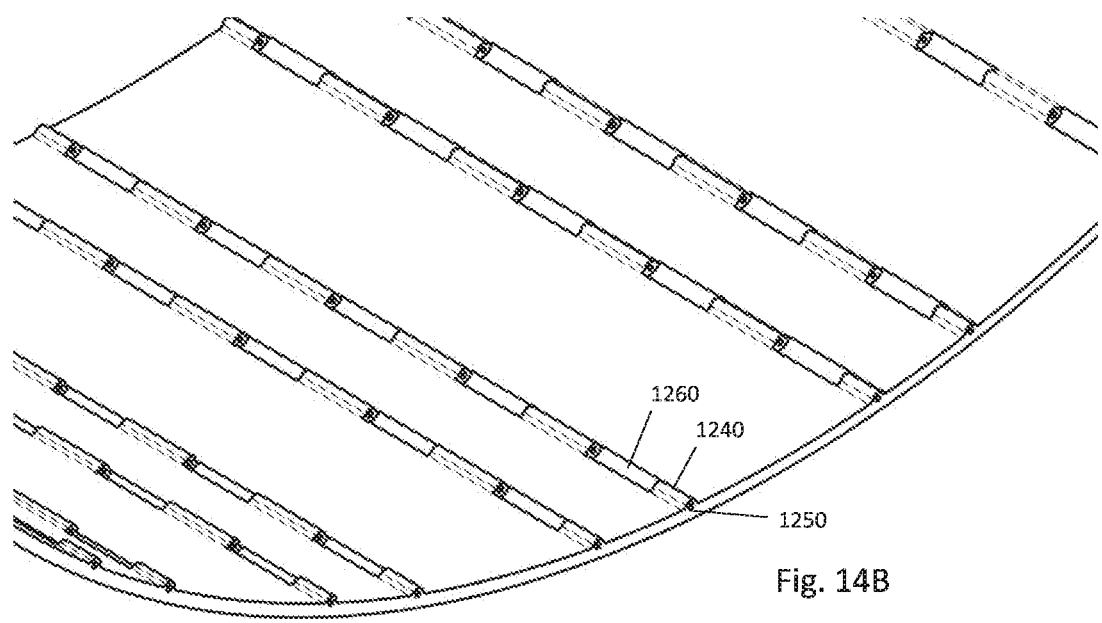
FIG. 14B is a perspective view of a portion of the outer ring shown in FIG. 14A.
Figure 14C:
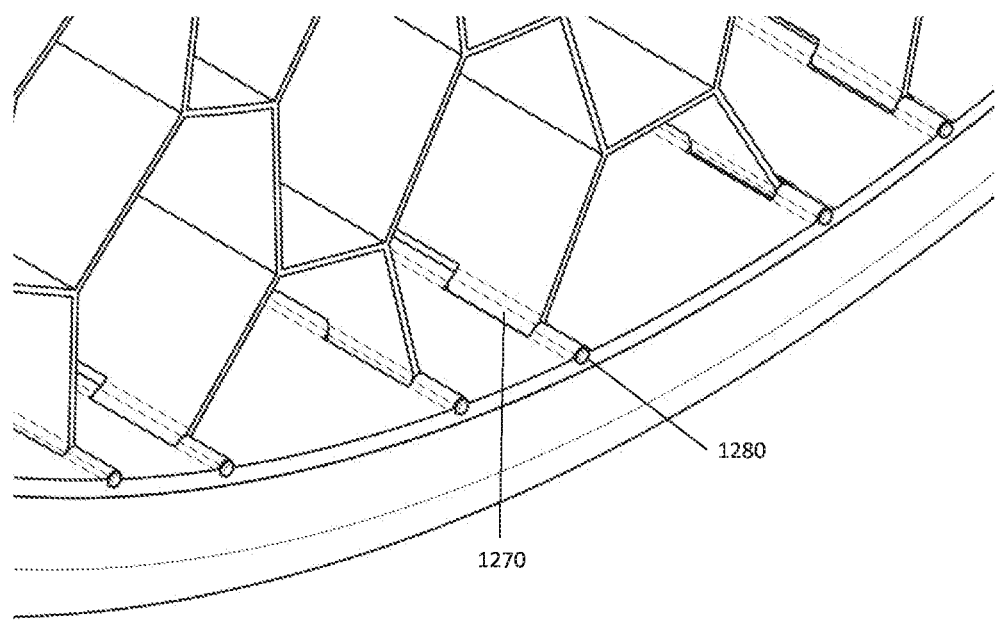
FIG. 14C is a detail view of a hinged connection between the web and the outer ring of FIG. 14A.

FIG. 14B illustrates a perspective view of a portion of the outer ring 1220, and FIG. 14C illustrates a detail view of a hinged connection between the web 1230 and the outer ring 1220. As can be seen in these views, the outer ring 1220 includes a plurality of axially spaced barrels 1240 at several circumferential locations. Each axially spaced barrel 1240 includes a thru-hole 1250 extending in the axial direction. In the illustrated embodiment the axially spaced barrels 1240 are separated by flat portions 1260. In alternative embodiments, the axially spaced barrels may be separated by grooved portions or apertures.

The web 1230 includes corresponding barrels 1270 with corresponding thru-holes (not shown). The corresponding barrels 1270 are disposed in the flat portions 1260 such that they are aligned with the axially spaced barrels 1240. A pin 1280 is inserted into the thru-holes of the barrels 1240, 1270 to form a hinged connection. Such a configuration is similar to the piano hinge design discussed above with reference to FIG. 7A. In an alternative embodiment (not shown), the hinged connections between the web and a ring may include pins, sockets, and socket-pins similar to those described above with reference to FIGS. 8-11. In another alternative embodiment (not shown), the hinged connections between the web and a ring may include ball and socket connections, such as those described above with reference to FIGS. 12 and 13.

Figure 14D:
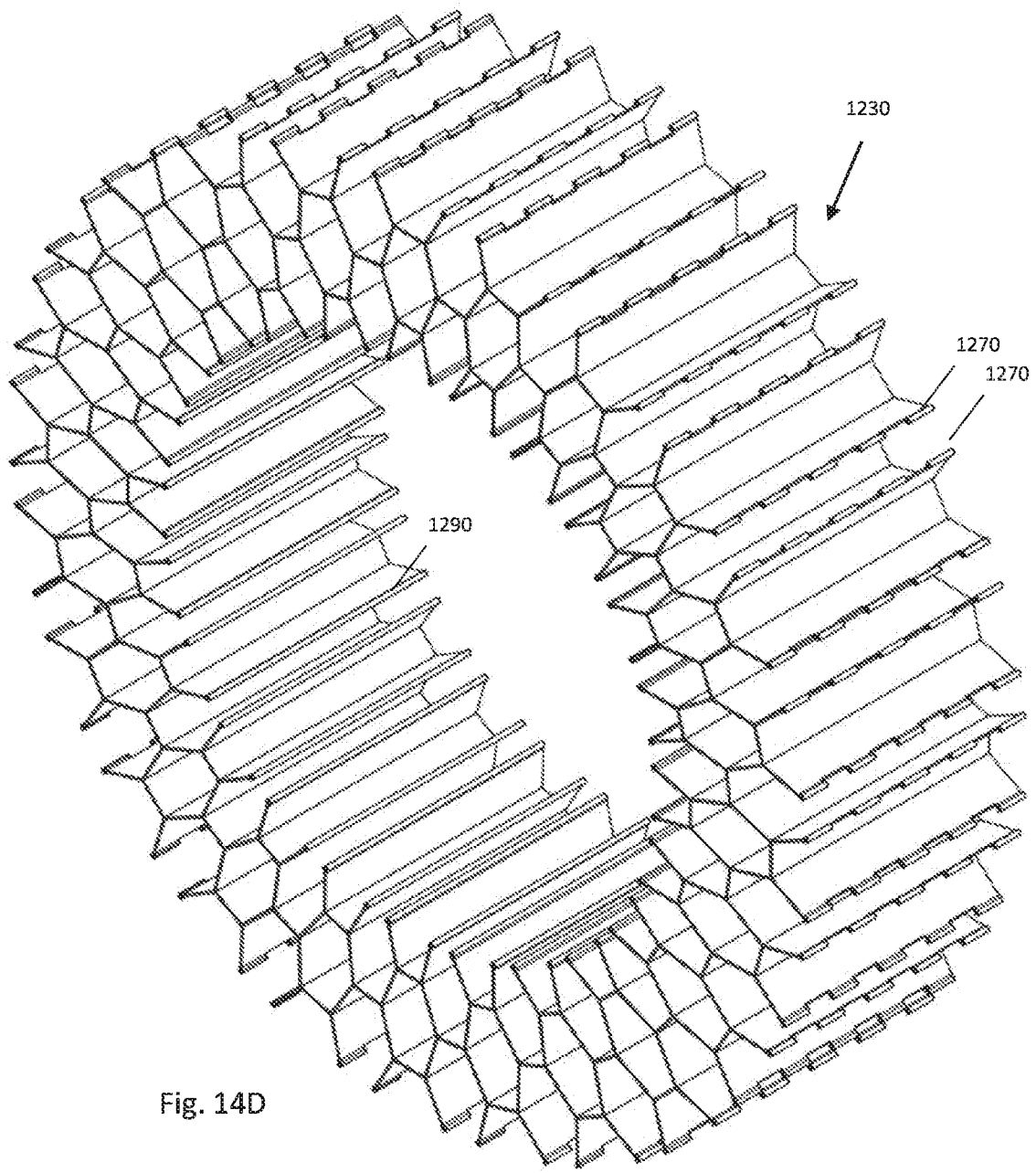
FIG. 14D is a perspective view of the web used in the tire of FIG. 14A.

FIG. 14D is a perspective view of the web 1230. As can be seen in this view, in addition to having barrels 1270 along its outer ends, the web 1230 further includes an elongated barrel 1290 at each of its inner ends. Each elongated barrel 1290 has a thru hole extending axially through the barrel. While the illustrated embodiment shows a single elongated barrel at each end, in alternative embodiments, multiple barrels are axially spaced along the inner ends of the web.

Figure 14E:
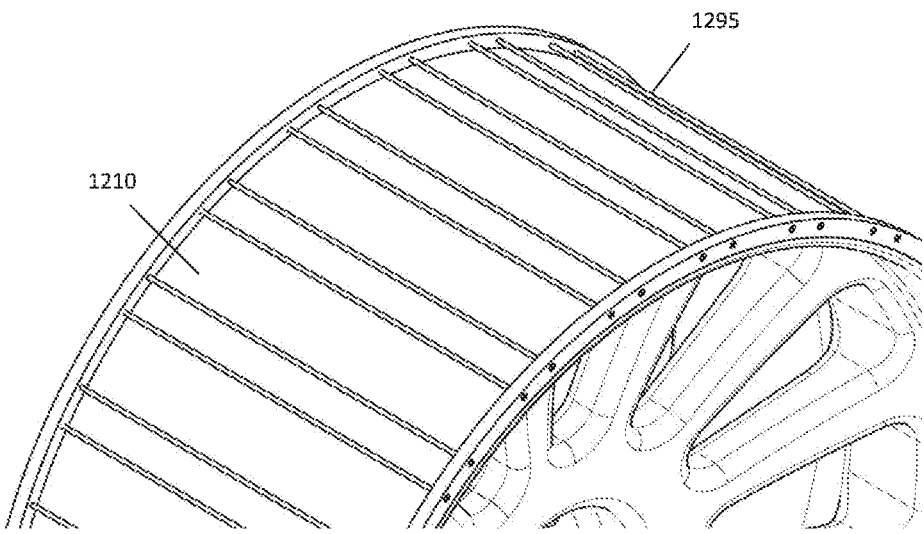
FIG. 14E is a partial perspective view of the wheel in FIG. 14A.

FIG. 14E is a partial perspective view of the wheel 1210. The wheel 1210 includes a plurality of pins 1295 spaced circumferentially about the wheel 1210. Each pin 1295 extends axially from one side of the wheel 1210 to the other. The wheel 1210 has apertures at each side to receive the pins 1295. In the illustrated embodiment, the pins 1295 are spaced apart by alternating large and small gaps. However, it should be understood that any pin spacing may be employed.

Figure 14F:
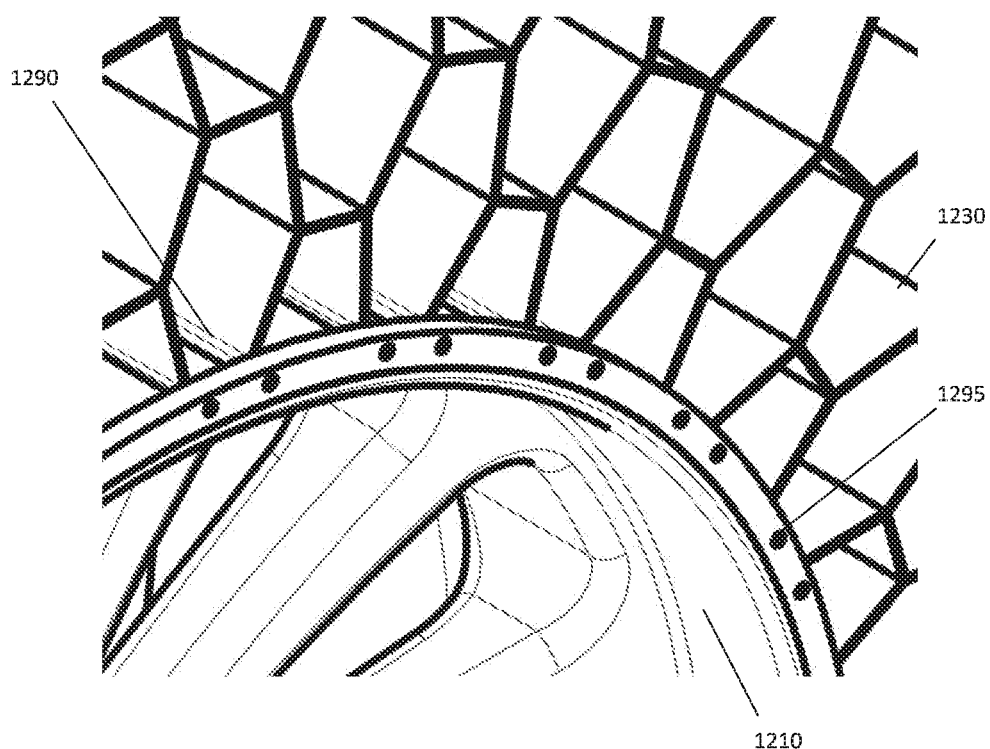
FIG. 14F is a detail view of a hinged connection between the web and the wheel of FIG. 14A.

FIG. 14F is a detail view of a hinged connection between the web 1230 and the wheel 1210. As can be seen in these views, the elongated barrels 1290 are aligned with the apertures of the wheel 1210. A pin 1295 is inserted through the apertures of the wheel 1210 and the thru-holes of the elongated barrels 1290 to form a hinged connection. Such a configuration is similar to the piano hinge design discussed above with reference to FIG. 7A. In an alternative embodiment (not shown), the hinged connections between the web and a ring may include pins, sockets, and socket-pins similar to those described above with reference to FIGS. 8-11. In another alternative embodiment (not shown), the hinged connections between the web and a ring may include ball and socket connections, such as those described above with reference to FIGS. 12 and 13.

In both the inner and outer hinged connections, the pins 1280, 1295 may be installed in a variety of ways including a press or interference fit, or by a threaded installation. The pins may pass through the entirety of the width of the structure or they may only partially extend some depth into the apertures. They may also pass through intermediate plates or guides in the structure to provide additional support and help maintain a uniform geometrical arrangement of the pins across the width of the web element.

Figure 15A:
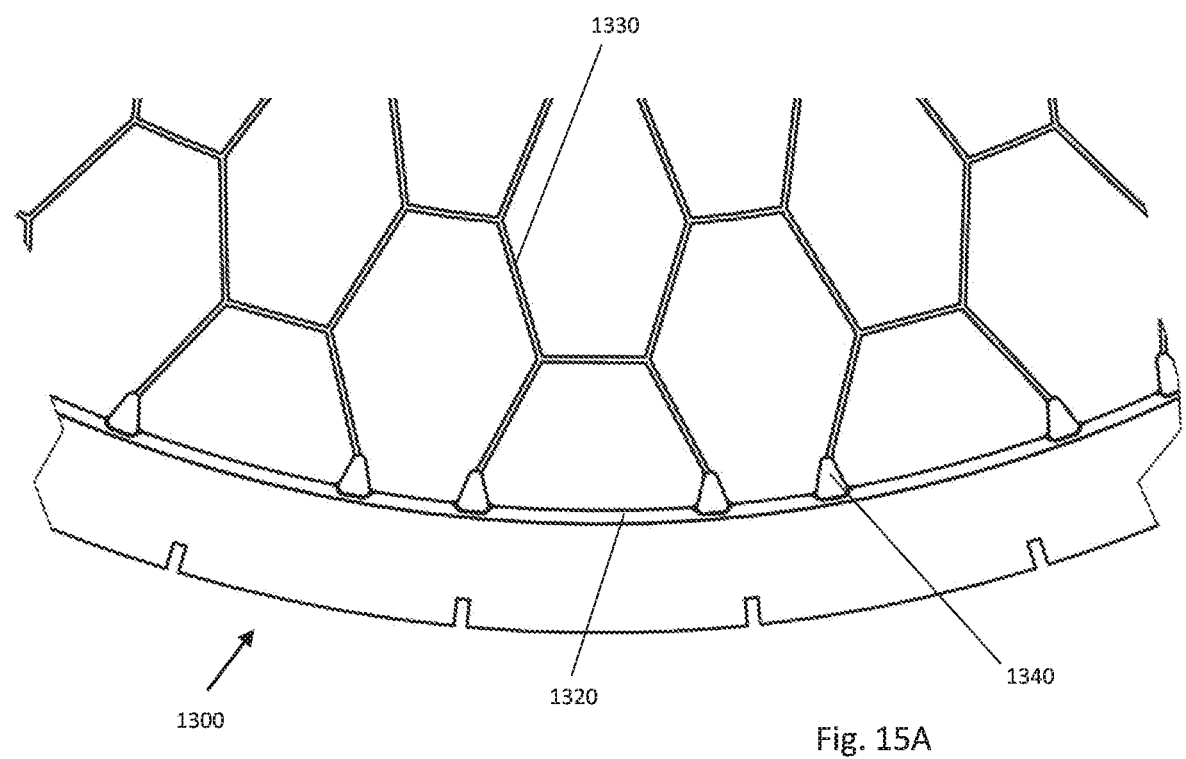
FIG. 15A is a front view of a portion of an alternative embodiment of a non-pneumatic tire with a web hingedly connected to an outer ring.
Figure 15B:
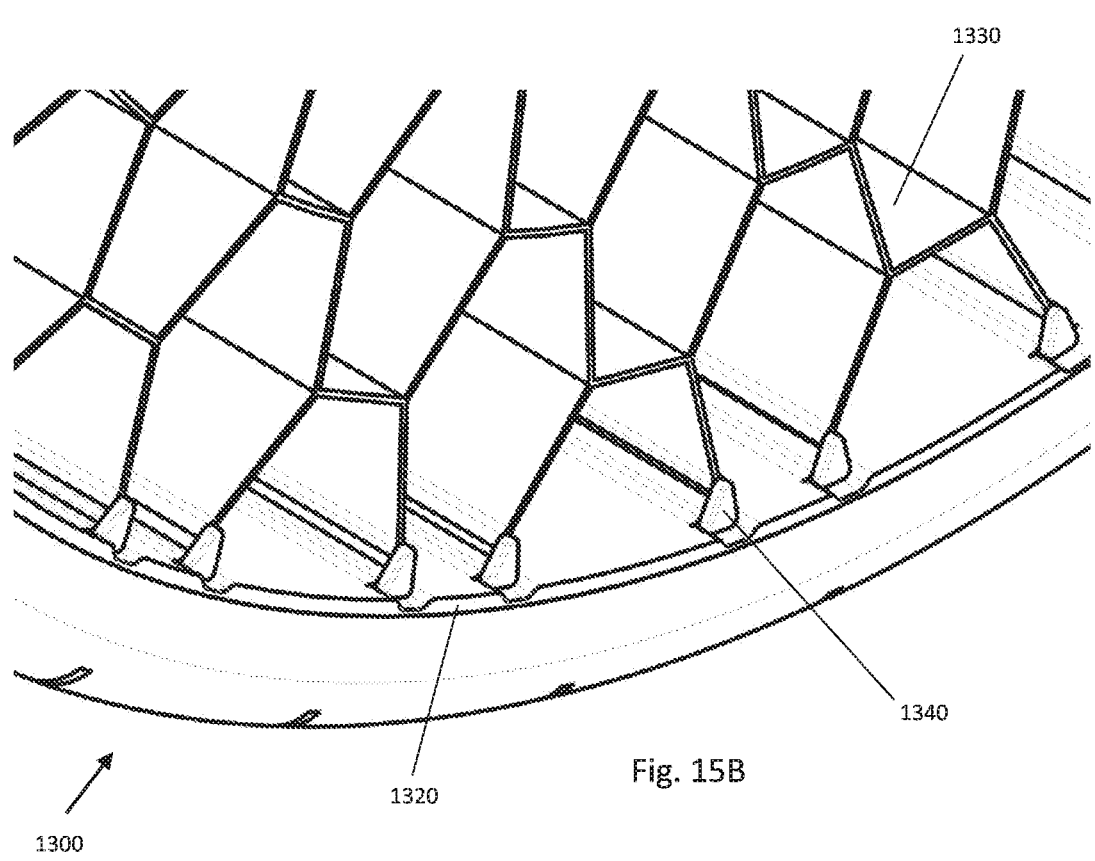
FIG. 15B is a perspective view of a portion of the non-pneumatic tire shown in FIG. 15A
Figure 15C:
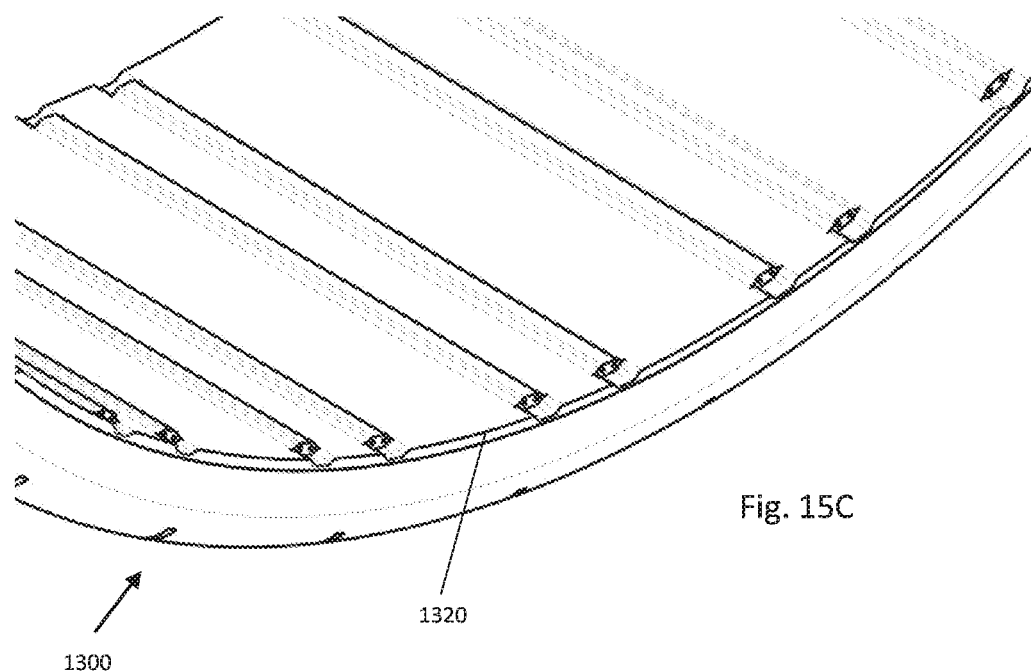
FIG. 15C is a perspective view of a portion of the outer ring shown in FIG. 15A.

FIGS. 15A and 15B illustrate a front view and a perspective view, respectively, of a portion of an alternative embodiment of a non-pneumatic tire 1300. The non-pneumatic tire 1300 includes an inner ring (not shown in these views) and outer ring 1320, and a web 1330 hingedly connected to the outer ring. FIG. 15C illustrates a perspective view of the non-pneumatic tire 1300 with the web 1330 removed, and is presented here for further reference. The tire 1300 is substantially the same as the tire 1200, except for the differences described below.

Figure 15D:
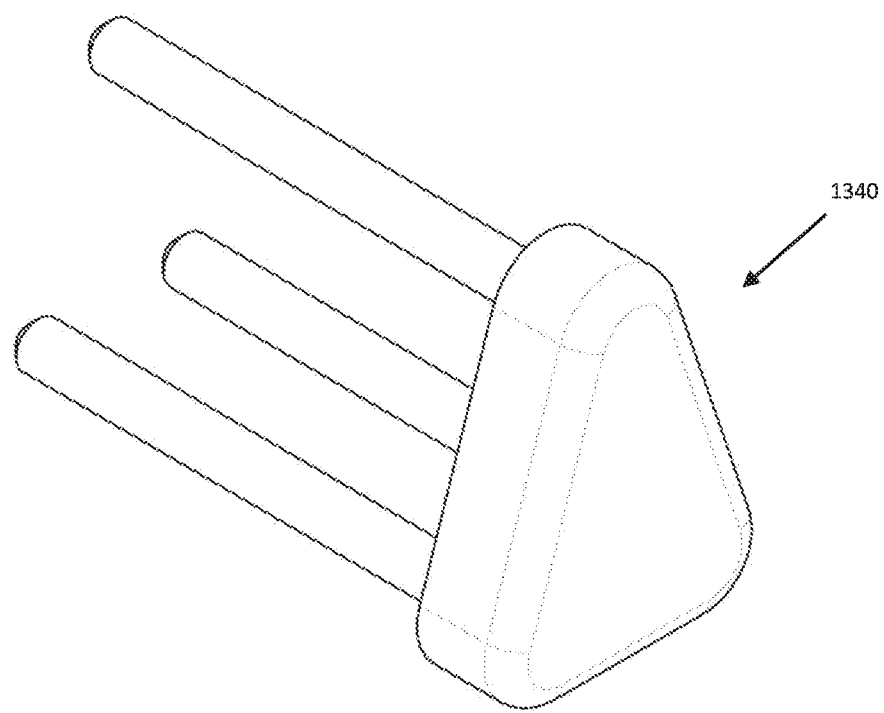
FIG. 15D is a perspective view of one embodiment of a triple pin joint for the non-pneumatic tire shown in FIG. 15A.

In the illustrated embodiment, each hinged connection is defined by a triple pin joint 1340. FIG. 15D illustrates a close-up, perspective view of the triple pin joint 1340. Unlike the piano hinge design of FIG. 14, the triple pin joint includes three pins received in three spaced apart apertures, rather than a single pin. The ends of the three pins are inserted into an end plate 1340 composed of a rigid material. Through this connection, a load may be transferred from outer ring to web, web to inner ring, and so on. In the illustrated embodiment, the pins are arranged as a substantially equilateral triangle within the end plate 1340. In alternative embodiments, the pins may be arranged in any given triangular or collinear arrangement. For example the pins may be arranged in isosceles or scalene configurations.

The pins may be installed in the end plates in a variety of ways including a press or interference fit, or by a threaded installation. The pins may pass through the entirety of the width of the structure to a complementary end plate on the opposing side or they may simply extend some depth into the hole in the near side of the web element. They may also pass through intermediate plates or guides in the structure to provide additional support and help maintain a uniform geometrical arrangement of the pins across the width of the web element.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A non-pneumatic tire comprising:
   an inner ring having an axis of rotation;
   an outer ring; and
   a flexible, interconnected web extending between the inner ring and the outer ring,
      wherein the flexible, interconnected web includes a plurality of web sectors disposed circumferentially about the tire to form a generally annular web,
      wherein the plurality of web sectors includes at least a first web sector, a second web sector, and a third web sector, each of the plurality of web sectors having a first circumferential element terminating in a first hinge and a second circumferential element terminating in a second hinge, each of the first and second circumferential elements being radially spaced from the inner ring and outer ring,
      wherein the second web sector is disposed circumferentially between the first web sector and the third web sector,
      wherein the first circumferential element of the second web sector is hingedly connected to the second circumferential element of the first web sector, and
      wherein the second circumferential element of the second web sector is hingedly connected to the first circumferential element of the third web sector.

2. The non-pneumatic tire of claim 1, wherein the inner ring is a solid inner ring and the outer ring is a solid outer ring.

3. The non-pneumatic tire of claim 1, wherein each of the plurality of web sectors is hingedly connected to the inner ring and hingedly connected to the outer ring.

4. The non-pneumatic tire of claim 1, wherein the inner ring includes a plurality of inner ring sectors that are circumferentially disposed to form the inner ring, and wherein the outer ring includes a plurality of outer ring sectors that are circumferentially disposed to form the outer ring.

5. The non-pneumatic tire of claim 1, wherein each web sector is a unitary component including an inner ring sector and an outer ring sector.

6. The non-pneumatic tire of claim 1, wherein the inner ring is formed by a plurality of axially adjacent inner ring portions and the outer ring is formed by a plurality of axially adjacent outer ring portions.

7. The non-pneumatic tire of claim 1, wherein the flexible, interconnected web is formed by a plurality of axially adjacent web portions.

8. The non-pneumatic tire of claim 1, wherein the flexible, interconnected web includes at least two radially adjacent layers of web elements at every radial cross-section of the tire, the web elements defining a plurality of generally polygonal openings and including a plurality of radial web elements that are angled relative to a plane that extends radially through the axis of rotation and a plurality of distinct tangential web elements that are generally transverse to a radial plane.

9. The non-pneumatic tire of claim 8, wherein the plurality of generally polygonal openings comprises a first plurality of generally polygonal openings having a first shape and a second plurality of generally polygonal openings having a second shape different from the first shape.

10. The non-pneumatic tire of claim 1, wherein each inner ring is a solid inner ring, wherein each outer ring is a solid outer ring, and wherein each of the plurality of web sectors is hingedly connected to the solid inner ring and hingedly connected to the solid outer ring.

11. The non-pneumatic tire of claim 1, wherein the first circumferential element of the second web sector includes a ball portion, and wherein the second circumferential element of the first web sector includes a socket portion.

12. A method of making a non-pneumatic tire, the method comprising:
    providing a plurality of a plurality of web sectors including at least a first web sector, a second web sector, and a third web sector, each of the plurality of web sectors having a first circumferential element terminating in a first hinge and a second circumferential element terminating in a second hinge, each of the first and second circumferential elements being radially spaced from the inner ring and outer ring;
    circumferentially arranging the plurality of web sectors to form a generally annular web, extending between an inner ring and an outer ring, such that the second web sector is disposed circumferentially between the first web sector and the third web sector;
    hingedly connecting the first circumferential element of the second web sector to the second circumferential element of the first web sector; and
    hingedly connecting the second circumferential element of the second web sector to the first circumferential element of the third web sector.

13. The method of claim 12, further comprising a step of hingedly connecting the plurality of web sectors to the inner ring.

14. The method of claim 12, further comprising a step of hingedly connecting the plurality of web sectors to the outer ring.

15. The method of claim 12, wherein the step of hingedly connecting the first circumferential element of the second web sector to the second circumferential element of the first web sector includes hingedly connecting the first circumferential element of the second web sector to the second circumferential element of the first web sector at a first radial elevation, and wherein the step of hingedly connecting the second circumferential element of the second web sector to the first circumferential element of the third web sector includes hingedly connecting the second circumferential element of the second web sector to the first circumferential element of the third web sector at a second radial elevation that is greater than the first radial elevation.

16. The method of claim 12, wherein the step of hingedly connecting the first circumferential element of the second web sector to the second circumferential element of the first web sector includes aligning a plurality of hollow barrels and inserting a pin into the aligned hollow barrels.

17. The method of claim 12, wherein the step of hingedly connecting the first circumferential element of the second web sector to the second circumferential element of the first web sector includes inserting a ball portion on the first circumferential element of the second web sector into a socket portion on the second circumferential element of the first web sector.

18. A non-pneumatic tire comprising:
    a plurality of axially adjacent wheel portions, each wheel portion including:

an inner ring, an outer ring, and a flexible, interconnected web extending between the inner ring and the outer ring, wherein the flexible, interconnected web includes a plurality of web sectors disposed circumferentially about the tire to form a generally annular web, each of the plurality of web sectors having a ball portion and a socket portion, and wherein each web sector is hingedly connected to a pair of oppositely adjacent web sectors through the ball portion and the socket portion.

19. The non-pneumatic tire of claim 18, wherein the plurality of web sectors define radial web elements and tangential web elements, wherein when a load is applied, a substantial amount of the load is supported by a plurality of the radial web elements working in tension, wherein a plurality of the radial web elements in a region above an axis of rotation are subjected to a tensile force while at least some of the radial web elements in a region between the load and a footprint region buckle and a plurality of the tangential web elements distribute the load through the flexible, interconnected web.

20. The non-pneumatic tire of claim 18, further comprising a tread carrying layer affixed to a radially external surface of the outer ring of each wheel portion.

\* \* \* \* \*